(12) United States Patent
Park

(10) Patent No.: US 7,754,158 B2
(45) Date of Patent: Jul. 13, 2010

(54) FILTER ASSEMBLY FOR AIR PURIFIER

(75) Inventor: Chan Su Park, Gwangju (KR)

(73) Assignee: Kwangjun Engineering Co., Ltd, Gwangju (KR)

( * ) Notice: Subject to any disclaimer, the term of this patent is extended or adjusted under 35 U.S.C. 154(b) by 371 days.

(21) Appl. No.: 11/885,303

(22) PCT Filed: Feb. 28, 2006

(86) PCT No.: PCT/KR2006/000701

§ 371 (c)(1),
(2), (4) Date: Aug. 28, 2007

(87) PCT Pub. No.: WO2006/112605

PCT Pub. Date: Oct. 26, 2006

(65) Prior Publication Data

US 2009/0136389 A1    May 28, 2009

(30) Foreign Application Priority Data

Feb. 28, 2005   (KR) ................... 10-2005-0016804

(51) Int. Cl.
*A61L 9/00* (2006.01)
(52) U.S. Cl. ................... 422/122; 422/24; 422/120; 422/121; 422/186.3; 96/223

(58) Field of Classification Search .............. 422/24, 422/120, 186.3, 121, 122; 96/223; 55/307; 502/350
See application file for complete search history.

(56) References Cited

FOREIGN PATENT DOCUMENTS

| JP | 409084866 A | * | 3/1997 |
| JP | 2002-346318 A | | 12/2002 |
| KR | 20-0204810 Y1 | | 9/2000 |
| KR | 20-0254611 Y1 | | 12/2001 |
| KR | 20-0321269 Y1 | | 7/2003 |

OTHER PUBLICATIONS

English language machine translation of JP409084866A, inventor: Murakami et al., http://www19.ipdl.inpit.go.jp/PA1/cgi-bin/PA1NUMBER.*
International Search Report for PCT/KR2006/000710, Jun. 29, 2006.

* cited by examiner

*Primary Examiner*—Sean E Conley
(74) *Attorney, Agent, or Firm*—Mitchell P. Brook; Luce, Forward, Hamilton & Scripps LLP

(57) ABSTRACT

A filter assembly for an air purifier is provided. The filter assembly includes base plates that are curved and have a lamp insertion hole formed at its center so that an ultraviolet (UV) lamp can be inserted thereto, a gap retaining member that keeps the base plates spaced apart from each other and combined with each other. Surfaces of the base plates are coated with either a photocatalyst material and silver nanoparticles. According to the filter assembly, the sterilizing and disinfecting capability can be enhanced by increasing a contact area between each of base plates and silver nanoparticles. In addition, since the filter assembly is easily assembled, length adaptability of the filter assembly can be achieved.

2 Claims, 2 Drawing Sheets

FILTER ASSEMBLY FOR AIR PURIFIER

TECHNICAL FIELD

The present invention relates to a filter assembly for an air purifier, and more particularly, to a filter assembly for an air purifier configured to increase sterilizing and deodorizing capabilities.

BACKGROUND ART

A filter assembly for an air purifier is largely classified into a filter for removing particulate matter, and a filter having sterilizing and deodorizing capabilities.

Examples of the particulate matter removing filter include a pre-filter, a medium filter, a high efficiency particulate air (HEPA) filter, an ultra-filter, and so on.

The pre-filter is capable of removing dust particles having a size equal to or greater than 5 □, and is made of a polypropylene sheet or non-woven fabric.

The medium filter is a filter having filtering efficiency of 40 to 95% and ranking 9 to 16 by maximum expiratory flow volume (MEFV), as particulate matter having a particles size of 1 to 3 □, as tested by the Society of Heating, Refrigerating and Air-Conditioning Engineers (ASHRAE) Standard. Inorganic fiber such as glass fiber and artificial fiber such as synthetic fiber are used as the medium filter. In recent years, however, due to several disadvantages resulting from the use of glass fiber, such as flyash of fibrous glass dust or a high pressure loss, synthetic fiber has become widely used.

As tested under the same standard requirements as the medium filter, the HEPA filter (or ultra-filter) is turned out to be a highly efficient filter, that is, having filtering efficiency of 99.97% or greater (99.999% for ultra-filter) and ranking 17 by MEFV, using glass fiber or synthetic fiber. For the same reason as in the medium filter, synthetic fiber is typically used for air purifier purposes.

Meanwhile, as the filter having sterilizing and deodorizing capabilities, a catalyzing filter is typically used. The catalyzing filter is configured to remove air-borne microorganisms such as viruses, *E. coli,* fungi, odor-generating substance, a variety of organic materials, germs, environmental hormones, and so on, by coating materials capable of performing a photocatalytic action on a metallic or fabric plate. A photocatalyst useful in such a catalyzing filter is a material that exhibits a powerful oxidizing effect when UV light having band-gap energy of approximately 3.2 eV is irradiated at a wavelength of about 400 nm or less, a representative useful example thereof is titanium dioxide ($TiO_2$).

When titanium dioxide is irradiated with UV light, electrons and holes are generated, the electrons and holes both having strong reducing and oxidizing effects. Particularly, the holes react with water and dissolved oxygen to generate hydroxyl (OH) radicals and free radicals called reactive oxygen species (ROS). Since the energy of the hydroxyl (OH) radicals is higher than the band-gap energy of molecules forming the organic matter, photocatalytic reactions using titanium dioxide ($TiO_2$) are employed in a wide variety of applications associated with environmental purification, including decomposition/conversion of contaminant chemical substance, various volatile organic compounds (VOCs), and so on.

However, since conventional catalyzing filters, either in industrial use or home use, exhibit sterilizing and disinfecting actions only through a photocatalytic reaction, the sterilizing and disinfecting capability of the catalyzing filter is determined by a reaction between photocatalyst materials. However, if suspended particulate matter is deposited on the photocatalyst materials, the reaction is retarded, resulting in an increase in a constant pressure, ultimately involving high power cost and requiring frequent filter replacement. In addition, the conventional catalyzing filters cannot provide for sterilizing and disinfecting capability when a lamp is not driven due to temporary power interruption or a lamp OFF driving in regular ON/OFF switching cycles.

Further, a general plate-type catalyzing filter is not length-adjustable with respect to lamps having variable lengths.

DISCLOSURE OF INVENTION

Technical Problem

To solve the above problems, it is an objective of the present invention to provide a filter assembly for an air purifier which can increase sterilizing and deodorizing capabilities and is configured to provide for length adaptability.

Technical Solution

To accomplish the above object of the present invention, there is provided a filter assembly for an air purifier comprising base plates that are curved and have a lamp insertion hole formed at its center so that an ultraviolet (UV) lamp can be inserted thereto, a gap retaining member that keeps the base plates spaced apart from each other and combined with each other, wherein surfaces of the base plates are coated with either a photocatalyst material and silver nanoparticles.

Preferably, the photocatalyst material is at least one selected from the group consisting of titanium dioxide, zinc oxide, and monazite.

In addition, a plurality of projecting members may be formed on the surfaces of the base plates to be spaced apart from each other. Here, the plurality of projecting members in the base plates are coated with at least one of a photocatalyst material and silver nanoparticles, and areas between each of the plurality of projecting members are coated with at least one of the photocatalyst material and the silver nanoparticles other than the material coated on the plurality of projecting members.

More preferably, the filter assembly further comprises a lamp holder made of an elastic material so that the lamp holder can be fittingly engaged with the lamp insertion hole of each of the base plates.

In addition, the filter assembly may further comprise a plurality of gap retaining holes in the base plates, wherein the gap retaining member comprises a spacer including an insertion pin being as long as it can pass through each of the gap retaining holes and extending longer than a thickness of each of the base plates, a body extending a predetermined length from the insertion pin and having an outer diameter greater than that of each of the gap retaining holes, and a fitting hole formed to a predetermined depth from an opposite end of the insertion pin of the body to allow the insertion pin to be inserted into the fitting hole.

BEST MODE FOR CARRYING OUT THE INVENTION

Figure 1:
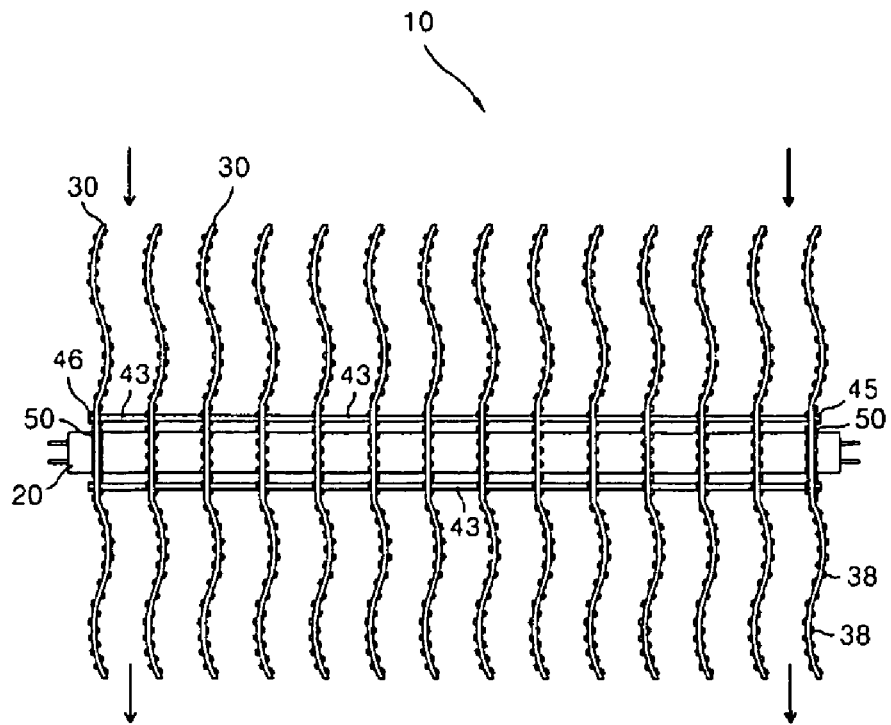
FIG. 1 is a plan view of a filter assembly for an air purifier according to an embodiment of the present invention.

Hereinafter, a filter assembly for an air purifier according to preferred embodiments of the present invention will now be described in greater detail with reference to the accompanying drawings. FIG. 1 is a plan view of a filter assembly for an air purifier according to an embodiment of the present invention, and FIG. 2 is an exploded perspective view of some elements shown in FIG. 1.

Figure 2:
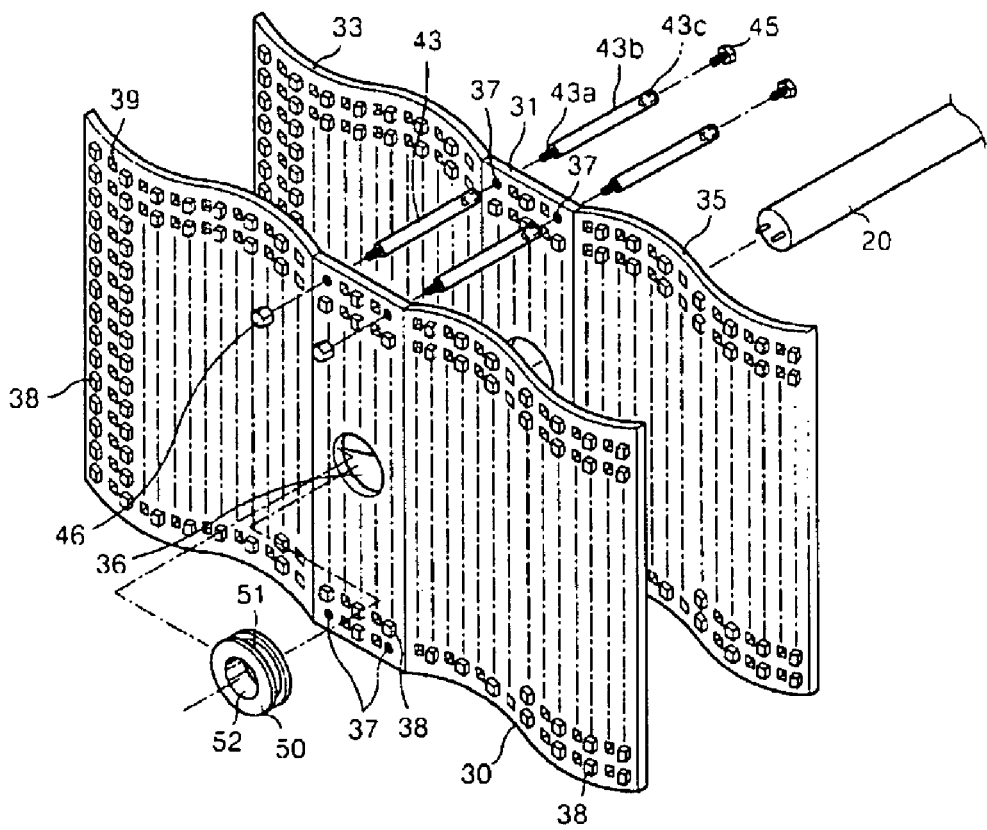
FIG. 2 is an exploded perspective view of some elements shown in FIG. 1.

Referring to FIGS. 1 and 2, the filter assembly 10 for an air purifier includes a ultra-violet (UV) lamp 20, a plurality of base plates 30, a gap retaining member, and a lamp holder 50.

The UV lamp 20 generally emits UV light having a sterilizing capability and generally employing a lamp emitting UV light in a wavelength range of less than or equal to 430 nanometers.

The base plates 30 are curved and integrally formed with each other. In detail, each of the base plates 30 includes a flat center part 31, and first and second curved parts 33 and 35 symmetrically extending from both ends of the flat center part 31 in an 'S' shape.

A photocatalyst material and silver nanoparticles are coated on a surface of each of the base plates 30.

Preferably, the photocatalyst material is selected from the group consisting of titanium dioxide ($TiO_2$), zinc oxide (ZnO), and monazite. In addition, to increase bondability when coating the photocatalyst material and silver nanoparticles on the base plates 30, an adhesive may be added to the photocatalyst material or the silver nanoparticles.

The adhesive commercially available is exemplified by an aqueous adhesive comprising styrene, methylmethacrylate, vinylacetate, ethylhexylacrylate, acrylic acid, itaconic acid, ethylene glycol dimethylacetate, and acrylamide.

A lamp insertion hole 36 is formed at the center of the flat center part 31 and a plurality of gap retaining holes 37 are formed at peripheral portions thereof.

The lamp insertion hole 36 is formed to be larger than a diameter of the UV lamp 20 to be used and is appropriately adjusted according to the size of the lamp holder 50.

A plurality of projecting members 38 are formed on surfaces of the flat center part 31 and the first and second curved parts 33 and 35. Recessed slots 39 are formed opposite to the plurality of projecting members 38. In the base plates 30, a plurality of projecting members 38 are formed by performing emboss processing on a metal plate, e.g., an aluminum metal plate. Preferably, the plurality of projecting members 38 in the base plates 30 are coated with at least one of a photocatalyst material and silver nanoparticles. In addition, areas between each of the plurality of projecting members 38 are coated with at least one of the photocatalyst material and the silver nanoparticles other than the material coated on the plurality of projecting members 38. In other words, the plurality of projecting members 38 are coated with the photocatalyst material, e.g., titanium dioxide, and the areas between each of the plurality of projecting members 38 are coated with silver nanoparticles. Alternatively, the projecting members 38 may be coated with silver nanoparticles, and the areas between each of the plurality of projecting members 38 may be coated with titanium dioxide.

The gap retaining member includes spacers 43, a bolt 45 and a nut 46.

Each of the spacers 43 is configured to combine the spaced-apart base plates 30 along the length of the UV lamp 20 to be mounted. In the illustrated embodiment, the spacer 43 includes an insertion pin 43a, a body 43b and a fitting hole 43c.

The insertion pin 43a of the spacer 43 is as long as it can pass through the gap retaining holes 37, and extends longer than a thickness of each of the base plates 30. The insertion pin 43a has a thread formed on its outer surface.

The body 43b of the spacer 43 extends a predetermined length from the insertion pin 43a and has an outer diameter greater than that of each of the gap retaining holes 37.

The fitting hole 43c of the spacer 43 is formed to a predetermined depth from an opposite end of the insertion pin 43a of the body 43b to allow the insertion pin 43a to be inserted into the fitting hole 43c. The fitting hole 43c has a thread on its inner surface to enable threaded connection between the insertion pin 43a and the fitting hole 43c.

A head of the bolt 45 has an outer diameter greater than that of each of the gap retaining holes 37, and a body of the bolt 45 has the same thread as that formed on the insertion pin 43a.

The nut 46 has an outer diameter greater than that of each of the gap retaining holes 37 and is configured such that the insertion pin 43a can be inserted into the nut 46 by thread connection.

With regard to the gap retaining member shown in FIG. 1, the spacer 43 is disposed between the base plates 30 to combine the base plates 30 with each other. The bolt 45 and the nut 46 are engaged with the spacer 43 at the outermost base plate 30 at either side, thereby achieving the overall fastening.

Unlike in the illustrated embodiment, each elements of the gap retaining member may have a fitting connection structure without a threaded. In such a case, the spacer may be made of an elastic synthetic resin material. Further, a fitting device or an insertion device connectable with the fitting slot and the insertion pin of the spacer, instead of the bolt or the nut, may be used without a thread.

Alternatively, the base plates 30 may be arrayed on a case or duct to be spaced apart from each other to then be integrated. In such an instance, the case or duct corresponds to a gap retaining member.

In another embodiment, the gap retaining holes 37 in the base plates 30 may be formed at peripheral portions of the first and second curved parts 33 and 35 of the base plates 30 for being combined by the gap retaining member.

The lamp holder 50 has a connection slot 51 on its outer surface to be fittingly engaged with the lamp insertion hole 36. In addition, the lamp holder 50 has a hole 52 into which the UV lamp 20 is inserted.

The lamp holder 50 is preferably made of a flexible, elastic material, e.g., rubber.

In the aforementioned filter assembly 10, air flow is created in a direction indicated by an arrow shown in FIG. 1, and a reaction between UV light emitted from the UV lamp 20 and titanium dioxide occurs, producing a large quantity amount of electrons and holes. Accordingly, diverse pathogenic bacteria and volatile organic compounds (VOCs) are removed by a large quantity of hydroxyl (OH) radicals generated due to recombination of electrons and holes. The air traveling in contact with the base plates 30 is sterilized and disinfected by silver nanoparticles.

The filter assembly 10 has enhanced filtering capability through the use of silver nanoparticles as well as photocatalyst materials. Also, the filter assembly 10 is advantageous in that it is easily adjustable in the number of arrays of the base plates 30 and the interval between each of the base plates 30 according to the length of the UV lamp 20 to be used.

Figure 3:
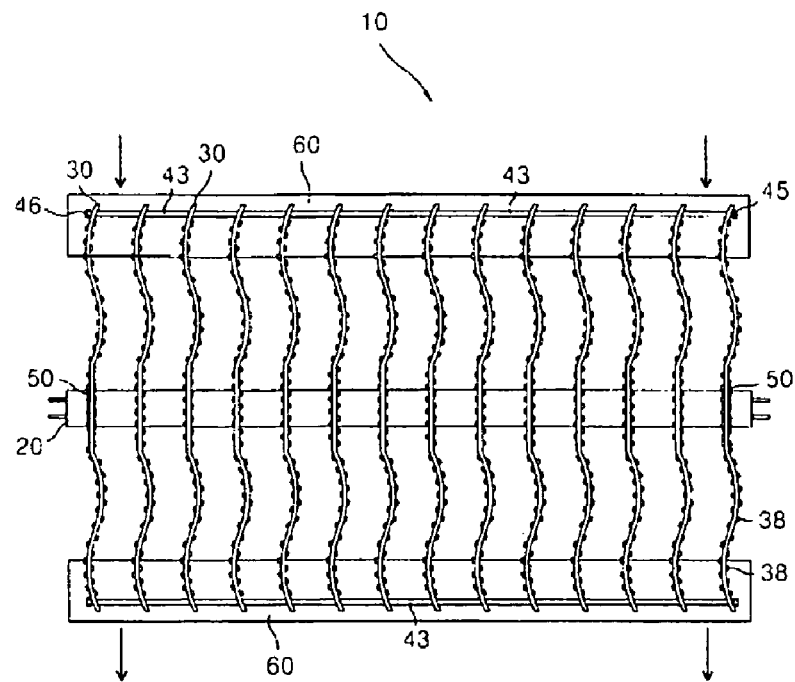
FIG. 3 is a plan view of a filter assembly for an air purifier according to another embodiment of the present invention.
Figure 4:
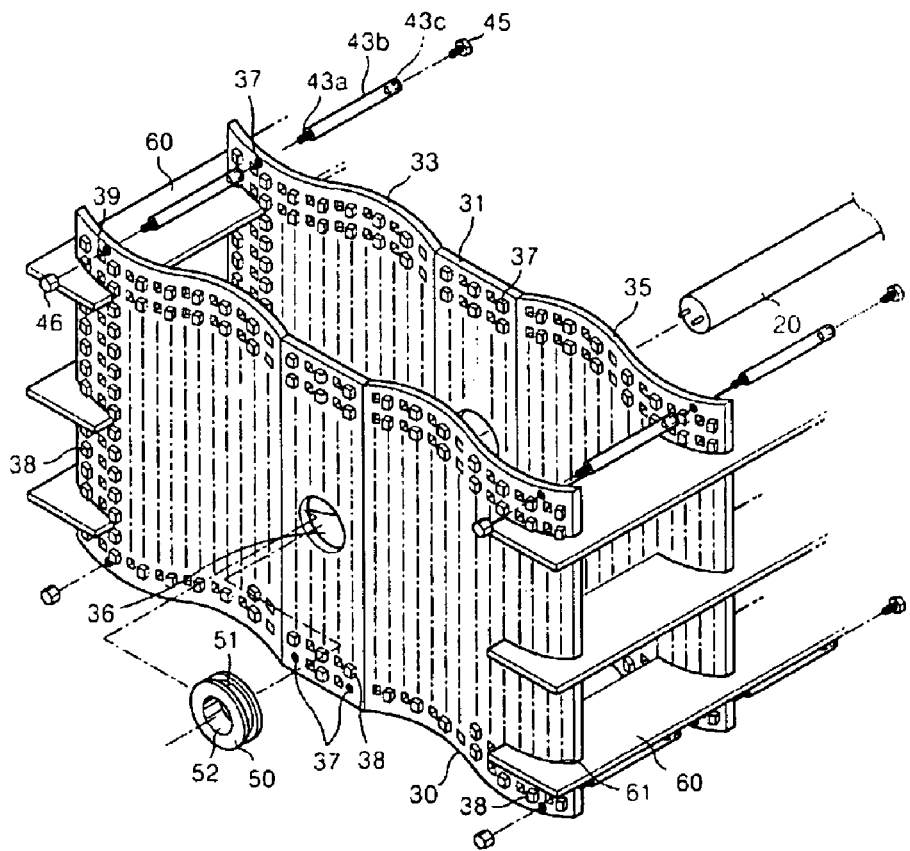
FIG. 4 is an exploded perspective view of some elements shown in FIG. 4.

In the filter assembly for an air purifier, to increase the sterilizing and disinfecting capability of the air passing through a space between the base plates 30 and to enhance bondability therebetween, auxiliary guide plates may be combined at edges of the base plates 30 in an array direction thereof, and an exemplary embodiment will be described with reference FIGS. 3 and 4. FIG. 3 is a plan view of a filter assembly for an air purifier according to another embodiment of the present invention, and FIG. 4 is an exploded perspective view of some elements shown in FIG. 4. The elements having the same functions as those shown in the previous drawings are denoted by the same reference numerals, and a detailed description thereof is omitted.

Referring to FIGS. 3 and 4, auxiliary guide plates 60 are combined from edges to centers of the respective base plates 30 by a predetermined length.

The auxiliary guide plates 60 extend in an arrayed direction of the base plates 30. The respective auxiliary guide plates 60 are spaced apart from each other in a longitudinal direction.

In addition, the surfaces of the auxiliary guide plates 60 are preferably coated with the photocatalyst material and silver nanoparticles, like in the base plates 30. Further, the auxiliary guide plate 60 may have projecting members as well.

The auxiliary guide plates 60 can be combined with peripheral sides of the base plates 30 horizontally or at any arbitrary angle with respect to the base plates 30. In an exemplary embodiment, among the three auxiliary guide plates 60, the center auxiliary guide plate 60 is horizontally combined with the base plates 30 and the upper and lower auxiliary guide plates 60 are combined with the peripheral sides of the base plates 30 at angles such that passageways extend from the peripheral sides of the base plates 30 toward the exterior of the assembly. A retention time of the air in the base plates 30 can be adjusted by varying resistance to the air flow in the base plates 30 according to the angle of inclination of the auxiliary guide plates 60.

The auxiliary guide plates 60 can be combined with the peripheral sides of the base plates 30 in a variety of method, for example, in such a manner that a fitting slot 61 is combined with a peripheral portion of each of the base plates 30.

In the illustrated embodiment, the gap retaining holes 37 of the base plates 30 are formed at peripheral portions of the first and second curved parts 33 and 35 and combined by the gap retaining member.

The additionally provided auxiliary guide plates 60 further enhance sterilizing and disinfecting effect of the air to be treated by allowing the air induced into the base plates 30 to contact the auxiliary guide plates 60.

INDUSTRIAL APPLICABILITY

As described above, the filter assembly for an air purifier according to the present invention can enhance sterilizing and disinfecting capability by increasing a contact area between each of base plates and silver nanoparticles. In addition, the filter assembly can be easily assembled, thereby achieving length adaptability thereof.

The invention claimed is:

1. A filter assembly for an air purifier comprising:
   base plates that are curved and have a lamp insertion hole formed at the center of said base plates so that an ultraviolet (UV) lamp can be inserted thereto;
   a gap retaining member that keeps the base plates spaced apart from each other and combined with each other, wherein surfaces of the base plates are coated with either a photocatalyst material and silver nanoparticles,
   wherein a plurality of projecting members are formed on the surfaces of the base plates to be spaced apart from each other, wherein the plurality of projecting members in the base plates are coated with at least one of a photocatalyst material and silver nanoparticles, and areas between each of the plurality of projecting members are coated with at least one of the photocatalyst material and the silver nanoparticles other than the material coated on the plurality of projecting members.

2. A filter assembly for an air purifier comprising:
   base plates that are curved and have a lamp insertion hole formed at the center of said base plates so that an ultraviolet (UV) lamp can be inserted thereto;
   a gap retaining member that keeps the base plates spaced apart from each other and combined with each other, wherein surfaces of the base plates are coated with either a photocatalyst material and silver nanoparticles,
   wherein the filter assembly further comprises a plurality of gap retaining holes in the base plates,
   wherein the gap retaining member comprises a spacer including an insertion pin being as long enough to pass through each of the gap retaining holes and extending longer than a thickness of each of the base plates, a body extending a predetermined length from the insertion pin and having an outer diameter greater than that of each of the gap retaining holes, and a fitting hole formed to a predetermined depth from an opposite end of the insertion pin of the body to allow the insertion pin to be inserted into the fitting hole.

\* \* \* \* \*